(12) United States Patent
Nasir et al.

(10) Patent No.: US 11,333,171 B2
(45) Date of Patent: May 17, 2022

(54) HIGH PERFORMANCE WEDGE DIFFUSERS FOR COMPRESSION SYSTEMS

(71) Applicant: HONEYWELL INTERNATIONAL INC., Charlotte, NC (US)

(72) Inventors: Shakeel Nasir, Torrance, CA (US); Nick Nolcheff, Chandler, AZ (US); Cristopher Frost, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/951,258

(22) Filed: Nov. 18, 2020

(65) Prior Publication Data

US 2021/0079929 A1    Mar. 18, 2021

Related U.S. Application Data

(63) Continuation-in-part of application No. 16/201,699, filed on Nov. 27, 2018, now Pat. No. 10,871,170.

(51) Int. Cl.
*F04D 29/44* (2006.01)

(52) U.S. Cl.
CPC .......... *F04D 29/444* (2013.01); *F04D 29/441* (2013.01); *F05D 2240/12* (2013.01); *F05D 2250/52* (2013.01)

(58) Field of Classification Search
CPC ...... F04D 29/444; F04D 29/441; F04D 29/44; F04D 29/464; F05D 2250/52; F05D 2250/38; F05D 2250/712
See application file for complete search history.

(56) References Cited

U.S. PATENT DOCUMENTS

| | | | | |
|---|---|---|---|---|
| 3,768,919 A | * | 10/1973 | O'Connor | F04D 29/441 415/116 |
| 3,841,789 A | * | 10/1974 | Corrigan | F04D 29/464 415/148 |
| 3,860,360 A | | 1/1975 | Yu | |
| 3,930,746 A | * | 1/1976 | Kronogard | F04D 17/127 415/149.1 |

(Continued)

FOREIGN PATENT DOCUMENTS

FR    2958346 A1    10/2011
WO    2010/02294 A1    1/2010

*Primary Examiner* — Woody A Lee, Jr.
*Assistant Examiner* — Behnoush Haghighian
(74) *Attorney, Agent, or Firm* — Lorenz & Kopf, LLP

(57) ABSTRACT

High performance wedge diffusers utilized within compression systems, such as centrifugal and mixed-flow compression systems employed within gas turbine engines, are provided. In embodiments, the wedge diffuser includes a diffuser flowbody and tapered diffuser vanes, which are contained in the diffuser flowbody and which partition or separate diffuser flow passages or channels extending through the flowbody. The diffuser flow channels include, in turn, flow channel inlets formed in an inner peripheral portion of the diffuser flowbody, flow channel outlets formed in an outer peripheral portion of the diffuser flowbody, and flow channel throats fluidly coupled between the flow channel inlets and the flow channel outlets. The diffuser vanes include a first plurality of vane sidewalls, which transition from linear sidewall geometries to non-linear sidewall geometries at locations between the flow channel inlets and the flow channel outlets.

20 Claims, 8 Drawing Sheets

(56) References Cited

U.S. PATENT DOCUMENTS

| | | | | |
|---|---|---|---|---|
| 3,963,369 | A * | 6/1976 | Balje | F04D 29/462 415/148 |
| 3,964,837 | A * | 6/1976 | Exley | F04D 29/441 415/181 |
| 3,997,281 | A | 12/1976 | Atkinson | |
| 4,022,541 | A * | 5/1977 | Perrigo | F04D 29/441 415/207 |
| 4,027,997 | A * | 6/1977 | Bryans | F04D 29/444 415/207 |
| 4,181,467 | A | 1/1980 | Campbell | |
| 4,576,550 | A * | 3/1986 | Bryans | F04D 29/444 415/208.3 |
| 5,131,142 | A * | 7/1992 | Brasz | F04D 29/444 29/888.02 |
| 5,252,027 | A * | 10/1993 | Brasz | F04D 29/444 415/224.5 |
| 5,716,192 | A | 2/1998 | Phillips et al. | |
| 6,672,856 | B1 | 1/2004 | Khalifa et al. | |
| 6,760,971 | B2 * | 7/2004 | Sasu | B23B 41/00 29/558 |
| 6,892,522 | B2 * | 5/2005 | Brasz | F01K 23/10 60/39.181 |
| 6,962,056 | B2 * | 11/2005 | Brasz | F02C 6/18 60/772 |
| 6,969,236 | B2 | 11/2005 | Giesler et al. | |
| 7,114,255 | B2 * | 10/2006 | Sasu | B23B 41/00 29/889.2 |
| 7,174,716 | B2 * | 2/2007 | Brasz | F01D 15/10 415/202 |
| 7,281,379 | B2 * | 10/2007 | Brasz | F01D 5/048 415/203 |
| 7,832,981 | B2 | 11/2010 | Hasan et al. | |
| 8,286,347 | B2 | 10/2012 | Dupeux et al. | |
| 8,616,836 | B2 * | 12/2013 | Blair | F04D 29/444 415/148 |
| 9,074,483 | B2 | 7/2015 | Breeze-Stringfellow et al. | |
| 9,222,485 | B2 * | 12/2015 | Brown | F04D 29/444 |
| 9,551,355 | B2 * | 1/2017 | Blair | F04D 29/444 |
| 9,638,212 | B2 | 5/2017 | Marshall | |
| 9,856,853 | B2 | 1/2018 | French | |
| 10,352,237 | B2 * | 7/2019 | Mazur | F04D 29/444 |
| 10,422,345 | B2 * | 9/2019 | Parker | F04D 17/10 |
| 2004/0006870 | A1 * | 1/2004 | Sasu | F04D 29/444 29/889.2 |
| 2004/0088983 | A1 * | 5/2004 | Brasz | F01D 5/048 60/651 |
| 2004/0088985 | A1 * | 5/2004 | Brasz | F01D 15/10 60/670 |
| 2004/0128832 | A1 * | 7/2004 | Sasu | B23B 41/00 29/889.2 |
| 2005/0163610 | A1 * | 7/2005 | Higashimori | F04D 29/444 415/191 |
| 2007/0277527 | A1 * | 12/2007 | Brasz | F01K 25/08 60/616 |
| 2012/0014788 | A1 * | 1/2012 | Blair | F04D 25/163 415/208.2 |
| 2012/0294711 | A1 | 11/2012 | Grigoriev et al. | |
| 2014/0186173 | A1 * | 7/2014 | Blair | F04D 25/163 415/209.3 |
| 2017/0342847 | A1 * | 11/2017 | Mazur | F02C 7/04 |
| 2018/0156059 | A1 * | 6/2018 | Toni | F01D 17/08 |
| 2018/0328381 | A1 * | 11/2018 | Parker | F04D 17/10 |

\* cited by examiner

HIGH PERFORMANCE WEDGE DIFFUSERS FOR COMPRESSION SYSTEMS

CROSS REFERENCE TO RELATED APPLICATION

This application is a continuation-in part and claims the benefit of co-pending U.S. patent application Ser. No. 16/201,699 filed on Nov. 27, 2018. The disclosure of the above referenced application is incorporated herein by reference.

TECHNICAL FIELD

The present invention relates generally to diffusers and, more particularly, to wedge diffusers including tapered vanes having unique sidewall geometries and other features, which improve performance aspects of the diffuser assembly.

BACKGROUND

Wedge diffusers are employed in compression systems to reduce the velocity of compressed airflow, while increasing static pressure prior to delivery of the airflow into, for example, a combustion section of a Gas Turbine Engine (GTE). As indicated by the term "wedge," wedge diffusers typically contain a plurality of wedge-shaped airfoils or tapered vanes, which are arranged in an annular array between two annular plates or endwalls. Collectively, the tapered vanes and the endwalls form an annular flowbody, which includes inlets distributed along its inner periphery and outlets distributed along outer periphery. Diffuser flow passages or channels connect the diffuser inlets to the diffuser outlets, with adjacent channels partitioned or separated by the tapered vanes. The tapered vanes are dimensioned and shaped such that the diffuser flow channels increase in cross-sectional flow area, moving from the inlets toward the outlets, to provide the desired diffusion functionality as compressed airflow is directed through the wedge diffuser.

Wedge diffusers are commonly utilized within GTEs and other turbomachines containing impellers or other compressor rotors. A given wedge diffuser may be positioned around an impeller to receives the compressed airflow discharged therefrom. The airflow decelerates and static pressure increases as the airflow passes through the wedge diffuser. The airflow may further be conditioned by other components, such as a deswirl section, contained in the GTE and located downstream of the wedge diffuser. The airflow is then delivered into the combustion section of the GTE, injected with a fuel mist, and ignited to generate combustive gasses. Thus, the efficiency which with a wedge diffuser is able to convert the velocity of the compressed airflow into static pressure, while avoiding or minimizing energy content losses due to excessive drag, boundary layer separation, wake generation and mixing, and other such effects, impacts the overall efficiency of the GTE compressor section. While conventional wedge diffusers perform adequately, generally considered, still further diffuser performance improvements are sought. A continued demand consequently exists, within the aerospace industry and other technology sectors, to provide wedge diffusers having improved aerodynamic performance characteristics, ideally with relatively little, if any tradeoffs in added weight, bulk, or manufacturing costs of the wedge diffuser.

BRIEF SUMMARY

High performance wedge diffusers utilized within compression systems, such as centrifugal and mixed-flow compression systems employed within gas turbine engines, are provided. In embodiments, the wedge diffuser includes a diffuser flowbody and tapered diffuser vanes, which are contained in the diffuser flowbody and which partition or separate diffuser flow passages or channels extending through the flowbody. The diffuser flow channels include, in turn, flow channel inlets formed in an inner peripheral portion of the diffuser flowbody, flow channel outlets formed in an outer peripheral portion of the diffuser flowbody, and flow channel throats fluidly coupled between the flow channel inlets and the flow channel outlets. The tapered diffuser vanes include a first plurality of vane sidewalls, which transition from linear sidewall geometries to non-linear (e.g., concave) sidewall geometries at transition locations disposed downstream from the flow channel throats.

In other embodiments, the wedge diffuser includes a diffuser flowbody and diffuser flow channels extending through the diffuser flowbody. The diffuser flowbody contains a first endwall, a second endwall, and diffuser vanes positioned in an annular array between the first endwall and the second endwall. The diffuser flow channels are bound or defined by the first endwall, the second endwall, and the diffuser vanes. Each of the diffuser flow channels defines a flow channel throat that lies along a line extending from an inboard end of one of the diffuser vanes. The diffuser vanes include, in turn: (i) upstream sidewall regions having a first sidewall geometry in a spanwise direction; and (ii) downstream sidewall regions having a second sidewall geometry in the spanwise direction, the second sidewall geometry different than the first sidewall geometry. In certain instances, the first and second sidewall geometries may be linear and concave sidewall geometries, respectively. A transition from the first sidewall geometry to the second sidewall geometry on each diffuser vane is disposed downstream from the flow channel throat of the respective diffuser vane.

In still other embodiments, a wedge diffuser is provided for directing flow from a rotor to a combustor. The wedge diffuser includes a diffuser flowbody and tapered diffuser vanes, which are contained in the diffuser flowbody and which partition or separate diffuser flow passages or channels extending through the flowbody. The diffuser flow channels include, in turn, flow channel inlets and flow channel outlets formed in inner and outer peripheral portions of the diffuser flowbody, respectively. Diffuser vanes are contained in the diffuser flowbody. The diffuser vanes include pressure sidewalls, which partially bound the diffuser flow channels. The pressure sidewalls each transition from a linear sidewall geometry to a concave sidewall geometry at a first location between the flow channel inlets and the flow channel outlets. The diffuser vanes further include suction sidewalls, which also partially bound the diffuser flow channels. The suction sidewall each transitioning from a linear sidewall geometry to a concave sidewall geometry at a second location between the flow channel inlets and the flow channel outlets. Each respective pressure sidewall and suction sidewall defines a diffuser flow channel with a flow channel centerline. A line (minimum distance) extending from an inlet end of the diffuser vane with the pressure sidewall and perpendicular to the flow channel centerline passes through and defines a throat point and a corresponding throat point on the diffuser vane with the suction sidewall. The first location is disposed in a downstream direction from the corresponding throat point, and the second location is disposed downstream from the throat point Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
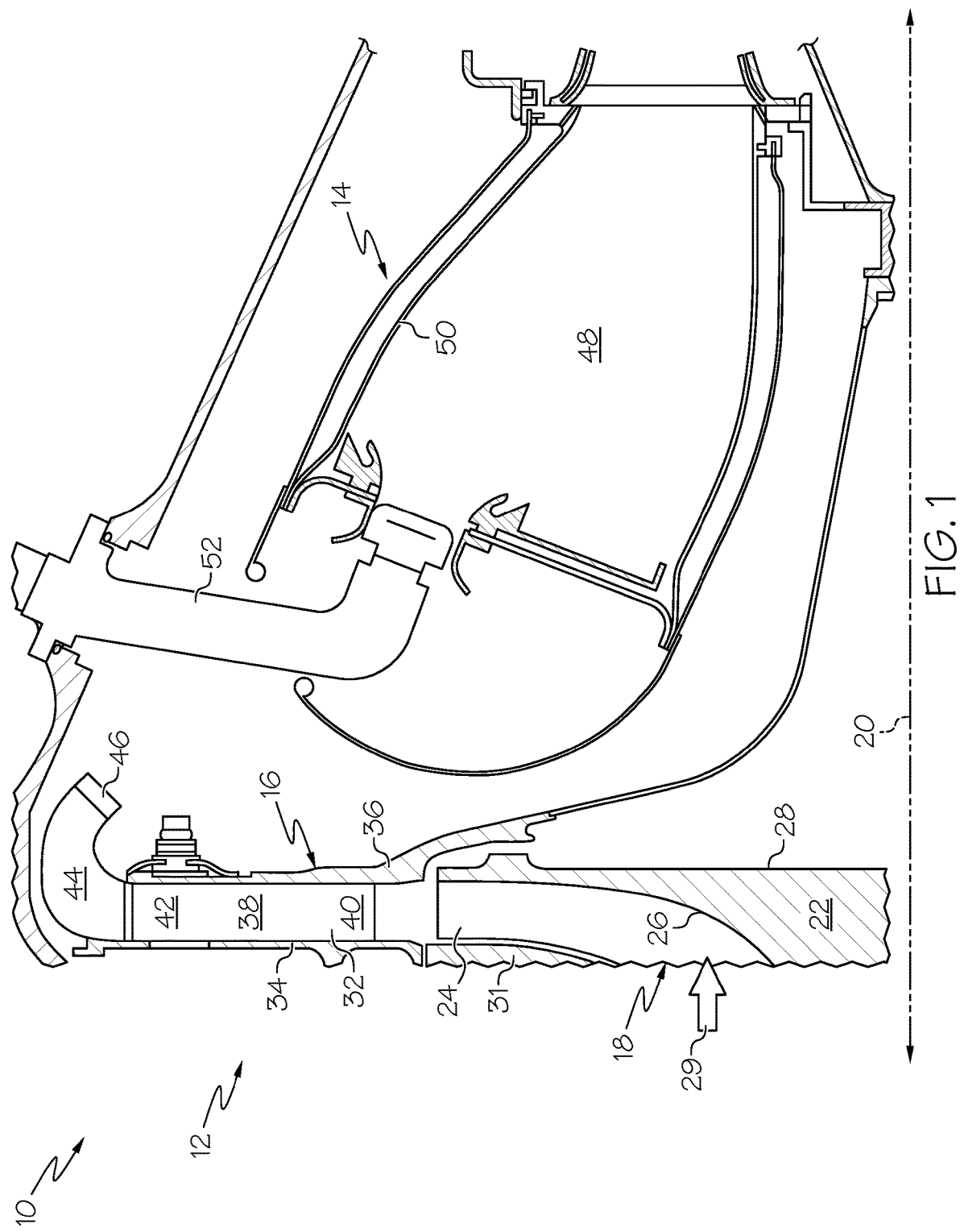
FIG. 1 is a cross-sectional view of a GTE combustor section and compressor section (both partially shown) including a high performance wedge diffuser, as illustrated in accordance with an exemplary embodiment of the present disclosure.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Definitions

Inboard—a relative term indicating that a named structure or item is located closer to the centerline of a Gas Turbine Engine (GTE) or GTE component (e.g., a wedge diffuser) than an "outboard" structure or item, as defined below.

Linear sidewall—Synonymous with the term "straight line element" sidewall. This term refers to a vane sidewall having a linear profile defined by a straight line taken in a spanwise direction; that is, along the span of the diffuser vane. Depending upon vane design, a straight line element or linear sidewall may curve or bend, as taken along the length of the vane.

Midspan—The portions of a wedge diffuser (defined below) equidistant between the wedge diffuser endwalls.

Non-linear sidewall region—A region of a vane sidewall having a non-linear profile, such as a concave profile, that cannot be defined by a single straight line in the spanwise direction.

Outboard—a relative term indicating that a named structure or item is located further from the centerline of a GTE or GTE component (e.g., a wedge diffuser) than an "inboard" structure or item, as defined above.

Wedge diffuser—A diffuser containing a plurality of vanes having vane thicknesses at or adjacent the downstream (e.g., outboard) ends of the vanes exceeding, and generally tapering downward to, the vane thicknesses at or adjacent the upstream (e.g., inboard) ends of the vanes.

Overview

The following describes wedge diffusers containing tapered vanes or wedge-shaped airfoils, which are imparted with unique sidewall geometries or profiles enhancing various diffuser performance characteristics. The vanes of the below-described high performance wedge diffusers include sidewalls regions having three dimensional, non-linear geometries, such as concave sidewall geometries, through the vane sidewall in spanwise directions. Such non-linear sidewall regions should be contrasted with the vanes of conventional wedge diffusers, which are typically characterized by two dimensional or straight line element sidewalls taken in spanwise planes through the vane sidewalls. Only selected regions of the vanes may be imparted with such non-linear (e.g., concave) sidewall geometries. For example, in certain embodiments, the suction sidewalls, the pressure sidewalls, or both the suction and pressure sidewalls of the diffuser vanes may include upstream sidewall regions having linear (straight line element) geometries and downstream sidewall regions having non-linear (e.g., concave) sidewall geometries. The juncture between the upstream sidewall region and the downstream sidewall region (and, therefore, the location at which the sidewall geometries transition from the linear sidewall geometries to the non-linear sidewall geometries) can vary among embodiments; however, performance benefits may be optimized by placing the transition between the linear to non-linear sidewall geometries of the diffuser vanes adjacent (that is, slightly upstream of, slightly downstream of, or at) the throats of the diffuser flow channels for reasons discussed below. Further, when non-linear sidewall geometries are provided on both the suction sidewall and pressure sidewall of a given diffuser vane, the shape and dimensions (e.g., concavity depth) of the non-linear sidewall geometries may vary, as may the location at which the suction and pressure sidewalls transition from a linear or straight line element geometry to a concave or other non-linear sidewall geometry.

The above-described variance in vane sidewall geometry imparts the wedge diffuser flow channels with a variable angle of divergence, which increases when moving along the length of the diffuser flow channels in the direction of airflow; that is, from the diffuser inlets toward the diffuser outlets. Such a geometry, referred to herein as a "variable two-theta (2θ) flow channel geometry," provides several benefits. Diffusion and mixing within the diffuser flow channels may be enhanced, particularly at or near the midspan of the wedge diffuser. Concurrently, energy content losses due to boundary layer separation, turbulence, and other such effects, which tend to occur at junctures between the diffuser vanes and diffuser endwalls, are minimized. This may optimize the static pressure recovery of the wedge diffuser, while improving or maintaining surge margin and other measures of diffuser flow stability. Wake downstream of the wedge diffuser may further be reduced to improve the performance of downstream components, such as a deswirl section located between the diffuser and the combustor section of a GTE. As a still further advantage, embodiments of the wedge diffuser can be manufactured with relatively little, if any additional cost over conventional wedge diffusers; and, in certain instances, can be readily installed within existing compression systems as a substitute or "drop-in replacement" for a conventional wedge diffuser of comparable dimensions. A non-limiting example of the high performance wedge diffuser will now be described in conjunction with FIGS. 1-4.

Non-limiting Example of A Gas Turbine Engine Containing the Wedge Diffuser

FIG. 1 is a simplified cross-sectional view of a GTE 10 including a compressor section 12 and a combustor section 14, both of which are partially shown. Compressor section 12 (also referred to herein as "centrifugal compression system 12") contains a high performance wedge diffuser 16, which is fabricated in accordance with an exemplary embodiment of the present disclosure and which is discussed more fully below. While wedge diffuser 16 is discussed below principally in the context of centrifugal compression system 12, high performance wedge diffuser 16 can be utilized within various other types of compression systems, regardless of whether such systems are contained in a GTE (propulsive or other), a different turbomachine (e.g., a turbocharger), or another device or system. Further, wedge diffuser 16 is not limited to usage within centrifugal compression systems, but rather can be utilized within various other types of compression systems including mixed-flow compression systems. The term "mixed-flow compression system," as appearing herein, refers to a compression system in which compressed airflow is discharged from a compressor rotor with an axial component and a radial component of comparable magnitudes. When employed within such a mixed-flow compression system, wedge diffuser 16 have a leaned or conical construction to better align the diffuser flow channels with the direction of airflow discharged from the compressor rotor. Accordingly, the following description of GTE 10 should be understood as merely establishing an exemplary, albeit non-limiting context in which embodiments of high performance wedge diffuser 16 may be better understood.

The illustrated portion of centrifugal compression system 12 includes a centrifugal compressor or impeller 18, only the trailing portion of which is shown. During GTE operation, impeller 18 spins rapidly about its centerline or rotational axis, which is represented by dashed line 20 FIG. 1. Dashed line 20 is also representative of the centerline of wedge diffuser 16 and GTE 10 generally and is consequently referred to hereafter as "centerline 20." Impeller 18 and wedge diffuser 16 will typically be generally axisymmetric about centerline 20, as will many of the components contained within GTE 10. Thus, when viewed in three dimensions, impeller 18 may possess a generally conical shape, while wedge diffuser 16 may have a substantially annular or ring-like geometry. Discussing impeller 18 in greater detail, impeller 18 includes a central body 22 from which a number of impeller vanes or blades 24 project (only one of which is shown in FIG. 1). Impeller blades 24 wrap or twist about centerline 20 in, for example, the direction of rotation of impeller 18. The outer conical surface or "hub" of impeller 18 is identified in FIG. 1 by reference numeral 26, while the backside or "disk" surface of impeller 18 is identified by reference numeral 28. As further indicated by arrow 29, a number of hub flow paths 30 extend over hub 26 and are separated by impeller blades 24. Impeller 18 and, more specifically, hub flow paths 30 are further enclosed by a shroud 31, which is partially shown and which is positioned around an outer periphery of impeller 18.

High performance wedge diffuser 16 includes a plurality of wedge-shaped airfoils or tapered vanes 32, one of which can be seen in FIG. 1. Diffuser vanes 32 are arranged in an annular array or circumferentially-spaced grouping, which is disposed between two annular plates or endwalls 34, 36. Endwall 34 is referred to below as the "shroud-side" or "forward" endwall 34 in view of its forward position relative to endwall 34 along centerline 20. Conversely, endwall 36 is referred to as the "disk-side" or "aft" endwall 36 below. Forward endwall 34 and aft endwall 36 are spaced along centerline 20 by a predetermined distance, with the spacing between endwalls 34, 36 equivalent to the span of diffuser vanes 32. Collectively, vanes 32 and endwalls 34, 36 define an annular diffuser flowbody 32, 34, 36. In other embodiments, wedge diffuser 16 may lean in an axial direction such that diffuser flowbody 32, 34, 36 has a more conical shape. A plurality of diffuser flow passages or channels 38 extends through flowbody 32, 34, 36 (again, only one of which is visible in FIG. 1). Specifically, diffuser flow channels 38 extend through flowbody 32, 34, 36 of wedge diffuser 16 in radially outward directions; that is, along axes substantially perpendicular to centerline 20. Diffuser flow channels 38 fluidly connect diffuser inlets 40, which are distributed (e.g., angularly spaced at regular intervals) about an inner periphery of diffuser 16; to diffuser outlets 42, which are similarly distributed (e.g., angularly spaced at regular intervals) about an outer periphery of diffuser 16. Additional description of high performance wedge diffuser 16 is provided below in conjunction with FIGS. 2-4. First, however, centrifugal compression system 12 and a combustion section 14 of GTE 10 is further described in connection with the operation of wedge diffuser 16.

During operation of GTE 10, centrifugal impeller 18 discharges compressed airflow in radially-outward directions (away from centerline 20) and into inlets 40 of diffuser 16. The airflow is conducted through diffuser flow channels 38 and is discharged from wedge diffuser 16 through outlets 42. In the illustrated GTE platform, the pressurized airflow discharged from outlets 42 is next conducted through a conduit or bend 44, which turns the airflow back toward centerline 20 of GTE 10. The newly-compressed airflow may also pass through a deswirl section 46, which contains vanes, baffles, or the like, to reduce any tangential component of the airflow remaining from the action of impeller 18. Afterwards, the pressurized airflow enters combustion section 14 and is received within combustion chamber 48 of combustor 50. A fuel spray is injected into combustion chamber 48 via fuel injector 52, and the fuel-air mixture is ignited within combustor 50. The resulting combustive gasses are then discharged from combustor 50 and directed into a non-illustrated turbine section of GTE 10 to generate the desired power output, whether mechanical, electrical, pneumatic, or hydraulic in nature, or a combination thereof. When assuming the form of a propulsive engine, such as a propulsive engine carried by an aircraft, GTE 10 may also discharge the combustive gasses through a non-illustrated exhaust section to generate thrust. In other embodiments, GTE 10 may assume the form of a non-propulsive engine, such as an Auxiliary Power Unit (APU) deployed onboard an aircraft, or an industrial power generator. With the operation of GTE 10 now described, additional discussion of high performance wedge diffuser 16 will now be provided in connection with FIGS. 2-4.

Example of the High Performance Wedge Diffuser Described in Greater Detail

Figure 2:
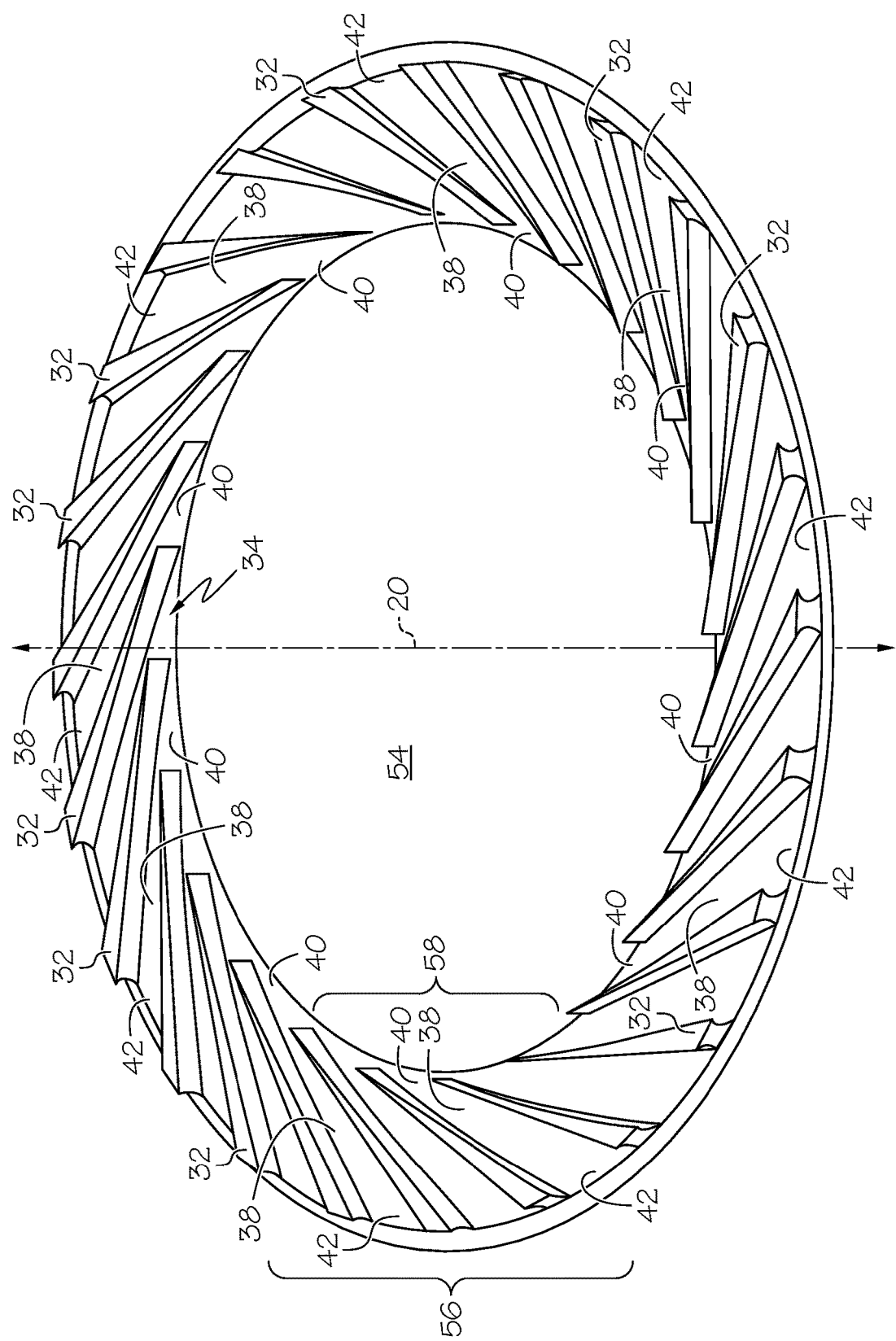
FIG. 2 is an isometric view of the high performance wedge diffuser shown in FIG. 1, as depicted with an endwall removed to better reveal the tapered vanes and the channels contained within the diffuser flowbody.

Referring now to FIG. 2, high performance wedge diffuser 16 is shown isometrically with aft endwall 36 removed to reveal the internal features of wedge diffuser 16, such as tapered diffuser vanes 32 and diffuser flow channels 38. Diffuser vanes 32 are arranged or spatially distributed in an annular array, which is angularly spaced about centerline 20 and which projects from the inner or aft face of forward endwall 34 in an axial direction toward aft endwall 36. More specifically, diffuser vanes 32 may extend to aft endwall 36 (shown in FIG. 1), with the spacing between endwalls 34, 36 defining the span of diffuser vanes 32 (identified as dimension "S" in FIG. 3). Diffuser vanes 32 may be integrally formed with either, both, or neither of endwalls 34, 36, depending upon the particular manufacturing technique utilized to produce wedge diffuser 16. In one manufacturing approach, forward endwall 34 and diffuser vanes 32 is produced as a single or monolithic piece, for example, by casting or utilizing removing material from a blank utilizing appropriate machining techniques. Aft endwall 36 may be separately fabricated in this case, and then brazed or otherwise bonded to vanes 32 opposite forward endwall 34 to yield wedge diffuser 16. Such a construction can also be inverted such that forward endwall 34 and vanes 32 are integrally formed as a single piece, with aft endwall 36 separately-fabricated and then bonded (or otherwise affixed) in its desired position. In other instances, wedge diffuser 16 may be produced as a single piece utilizing a casting or additive manufacturing process. Various other manufacturing approaches are also possible and within the scope of the present disclosure.

In the isometric view of FIG. 2, the annular shape of wedge diffuser 16 can be better seen, noting central opening 54 formed in diffuser flowbody 32, 34, 36. In addition to opening 54, annular diffuser flowbody 32, 34, 36 includes an outer peripheral portion 56 and an inner peripheral portion 58 around which outer peripheral portion 56 extends. Inner peripheral portion 58 of flowbody 32, 34, 36 circumscribes and defines central opening 54, which accommodates or receives impeller 18 when diffuser 16 is installed within GTE 10 (FIG. 1). As previously indicated, inlets 40 and outlets 42 are angularly spaced about inner peripheral portion 58 and outer peripheral portion 56 of diffuser flowbody 32, 34, 36, respectively. Due to the wedge-shaped geometry of diffuser vanes 32, diffuser flow channels 38 increase in cross-sectional flow area when moving from inlets 40 to outlets 42 in radially outward directions to provide the desired diffusion functionality. In accordance with embodiments of the present disclosure, this functionality is enhanced by imparting selected regions or targeted geometries of the vane sidewalls with non-linear geometries, such as concave geometries, defining the below-described variable 2θ flow channel geometry. Further description of a single diffuser vane 32 (identified as diffuser vane "32(a)") will now be provided in connection with FIG. 3. Diffuser vane 32(a) may be substantially identical to all other diffuser vanes 32 contained in wedge diffuser 16 in at least some embodiments; thus, the following description is equally applicable thereto.

Figure 3:
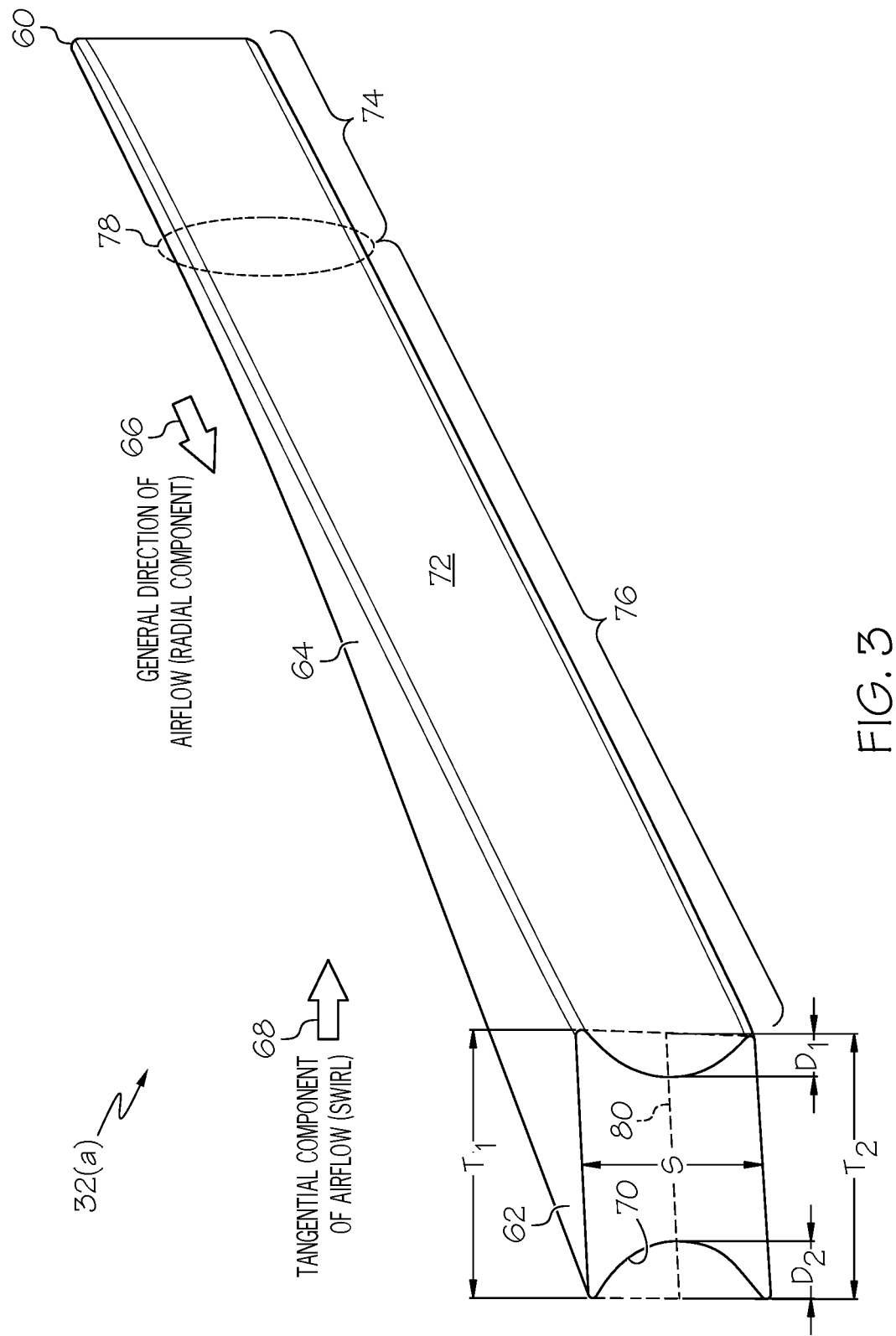
FIG. 3 is an isometric view of a tapered vane included in the exemplary wedge diffuser of FIGS. 1-2 more clearly illustrating the non-linear (e.g., concave) sidewall regions of the tapered vane in an embodiment.

Turning to FIG. 3, a single diffuser vane 32(a) is shown in isolation. Diffuser vane 32(a) includes an upstream or inboard end 60; an opposing, downstream or outboard end 62; and an intermediate portion 64 extending between ends 60, 62. The radially-outward direction of airflow along diffuser vane 32(a) is represented by arrow 66 in FIG. 3, while arrow 68 denotes the tangential component of the airflow. Diffuser vane 32(a) further includes a pressure face, side, or sidewall 70 (principally impinged upon by the airflow due to tangential component 68); and a suction face, side, or sidewall 72 opposite pressure sidewall 70 taken through the vane thickness. Suction sidewall 72 is further divided (in a conceptual or design sense) into two sidewall regions 74, 76 distinguished by differing sidewall geometries in the spanwise direction, as discussed more fully below. As can be seen, sidewall region 74 is located closer to inboard end 60 of diffuser vane 32(a) and is consequently referred to below as "upstream sidewall region 74." Conversely, sidewall region 76 is located closer to outboard end 62 and is consequently referred to below as "downstream sidewall region 76." Diffuser vane 32(a) further includes a transition region or zone 78 located at the juncture between ends 60, 62. Transition regions 78 represent the sidewall location at which suction sidewall 72 transitions from a first sidewall geometry or profile (that of upstream sidewall region 74) to a second, different sidewall geometry or profile (that of downstream sidewall region 76) in the illustrated example.

In various embodiments, upstream sidewall region 74 of suction sidewall 72 is imparted with a linear (straight line element) sidewall geometry, as taken in a spanwise direction; while downstream sidewall region 76 of suction sidewall 72 is imparted with a non-linear sidewall geometry, such as a concave sidewall geometry, in the spanwise direction. In such embodiments, the concave geometry or profile of downstream sidewall region 76 may have a maximum concavity or depth $D_1$, as taken at or adjacent outboard end 62 of diffuser vane 32(a) and measured at the midspan of vane 32(a). In the illustrated example in which the interior faces of endwalls 34, 36 bounding flow channels 38 are parallel, the diffuser midspan may be defined by a plane, the location of which is generally identified in FIG. 3 by dashed line 80. In further implementations, however, the diffuser midspan may have a non-planar shape; e.g., as will be the case when, for example, the interior faces of endwalls 34, 36 are conical or otherwise have a non-parallel relationship. In addition to $D_1$, the respective thicknesses of diffuser vane 32(a) at junctures with forward endwall 34 and aft endwall 36 are also identified in FIG. 3 by double-headed arrows "$T_1$" and "$T_2$," respectively. Finally, double-headed arrow "S" denotes the span of vane 32(a) in FIG. 3.

When the concave geometry of downstream sidewall region 76 is bilaterally symmetrical about diffuser midspan 80, the maximum concavity depth may be located at diffuser midspan 80. In other implementations, the maximum concavity depth may be located above or below diffuser midspan 80 depending upon, for example, the particular geometry of downstream sidewall region 76 of suction sidewall 72. In still other instances, and as noted above, high performance radial diffuser 16 may have a leaned or conical shape, which may be the case when wedge diffuser 16 is utilized within a mixed-flow compression system. In such instances, diffuser endwalls 34, 36 may not have parallel disc-like shapes, but rather conical or other shapes, as previously-noted. Further, in such instances, the midspan of diffuser 16 will not be defined as a plane, but rather as a more complex (e.g., conical) three dimensional shape. Regardless of the shape of endwalls 34, 36, the maximum concavity depth of the non-linear sidewall regions will typically occur in a predefined range along the span of the vanes. For example, in embodiments, the maximum concavity depth of the non-linear sidewall regions may occur between about 30% and about 70% of the span of a given diffuser vane. In other instances, the maximum concavity depth may occur outside of the aforementioned spanwise range.

The depth of concavity at the midspan of suction sidewall 72 (again, identified as "$D_1$" in FIG. 3) gradually decreases when moving from outboard end 62 of diffuser vane 32(a) in a radially inward direction toward inboard end 60. Depending upon the particular manner in which downstream sidewall region 76 is contoured or shaped, the suction side (SS) midspan concavity depth ($D_1$) may decrease in a linear or gradual fashion (shown) or, instead, decrease in a non-linear manner. The SS midspan concavity depth ($D_1$) decreases in this manner until reaching a zero value at transition zone 78 in the illustrated embodiment. A smooth, step-free or aerodynamically-streamlined sidewall topology is consequently provided when transitioning from the planar sidewall geometry of upstream sidewall region 74 to the concave sidewall geometry of downstream sidewall region 76. In a similar regard, the values of $T_1$ and $T_2$ may likewise decrease from maxima at outboard end 62 to minima at inboard end 60 to impart diffuser vane 32(a) with its wedge-shaped geometry and, particularly, to impart inboard end 60 with a relatively narrow or reed-like shape well-suited for partitioning the incoming airflow in a low resistance manner.

With continued reference to FIG. 3, pressure sidewall 70 of diffuser vane 32(a) may be imparted with a sidewall geometry or profile similar to, if not substantially identical to (mirrors) that of suction sidewall 72. In such embodiments, and as does suction sidewall 72, pressure sidewall 70 may include: (i) an upstream sidewall region imparted with a first (e.g., linear or straight line element) sidewall geometry and corresponding to upstream sidewall region 74 of suction sidewall 72, and (ii) a downstream sidewall region imparted with a second (e.g., non-linear or concave) sidewall geometry and corresponding to downstream sidewall region 76 of suction sidewall 72. Further, the sidewall geometry of pressure sidewall 70 from the first sidewall geometry to the second sidewall geometry in a transition region, the position of which may vary relative to region 78 shown in FIG. 3. As further labeled in FIG. 3, the maximum concavity of pressure sidewall 70 ($D_2$) may occur at outboard end 62 of diffuser vane 32(a) taken at the diffuser midspan. In the illustrated example in which sidewalls 70, 72 have similar or substantially identical geometries, $D_1$ and $D_2$ may be substantially equivalent.

Figure 4:
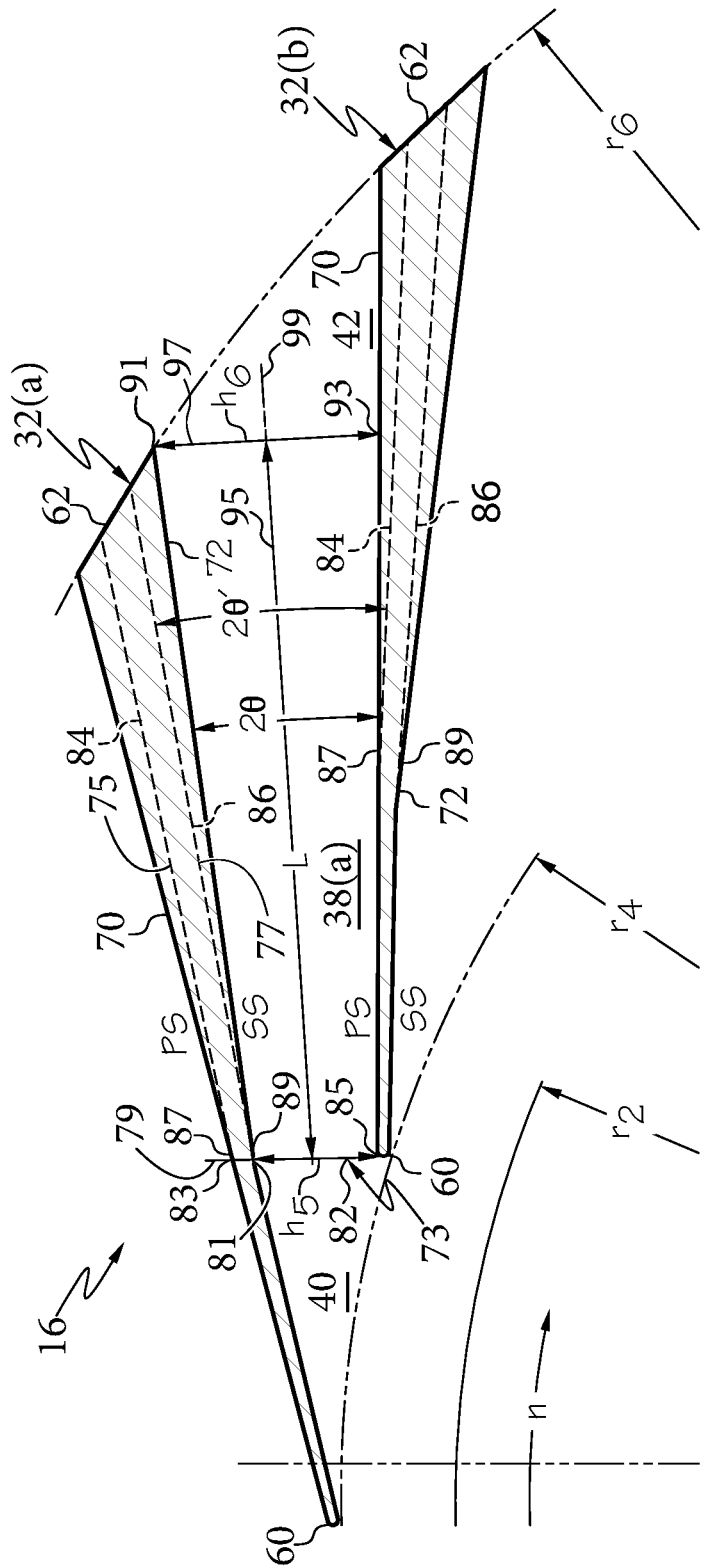
FIG. 4 is an axial view (that is, a view taken an axis parallel to the centerline of the wedge diffuser) of two adjacent vanes included in the exemplary wedge diffuser of FIGS. 1-2 visually identifying the flow passage divergence angles and other dimensional parameters of the wedge diffuser.
Figure 5:
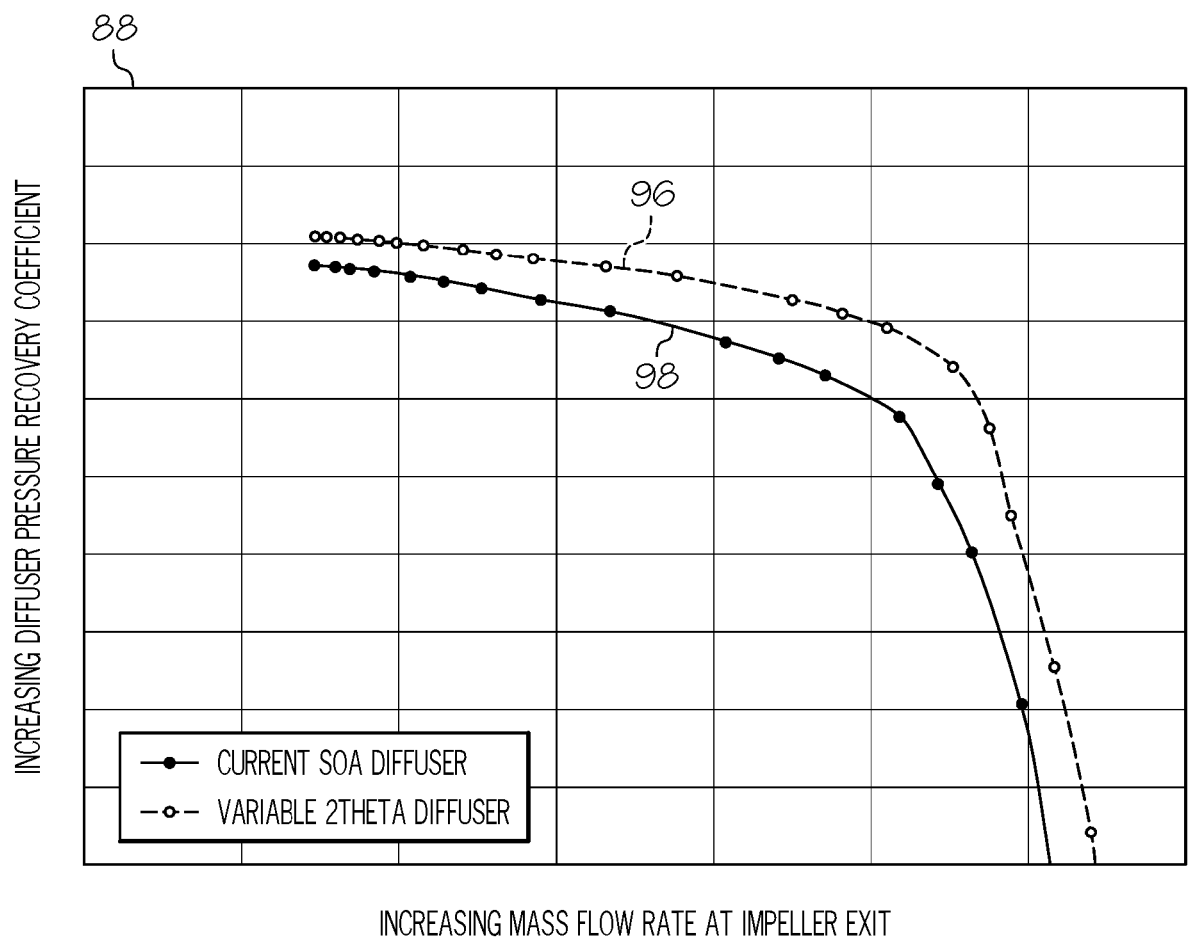
FIGS. 5-8 graphically present improved performance characteristics achieved by the high performance wedge diffuser shown in FIGS. 1-2 relative to a wedge diffuser containing vanes having strictly linear (straight line element) sidewall geometries.
Figure 6:
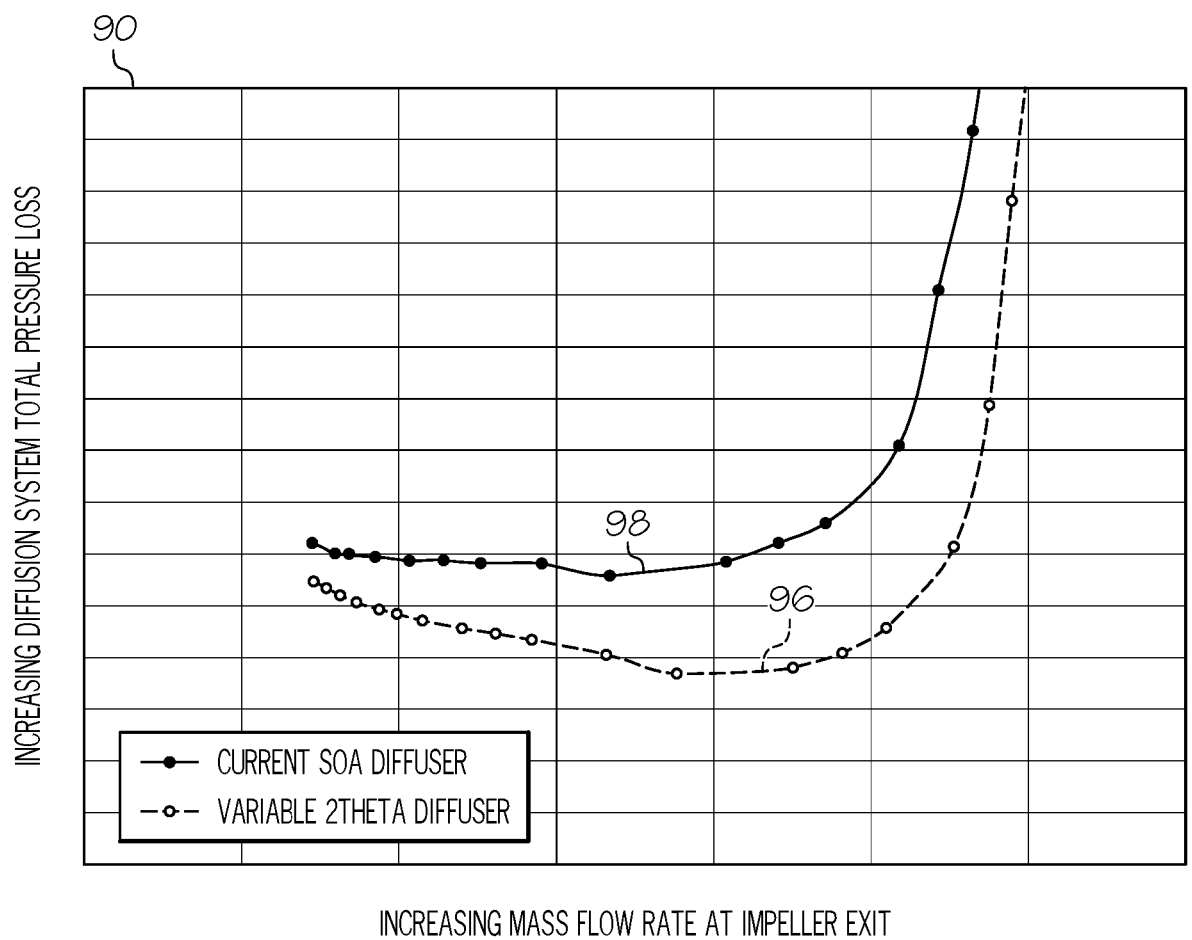

As noted above, sidewalls 70, 72 may be imparted with identical or substantially identical concave profiles in at least some embodiments; e.g., such that sidewalls 70, 72 are mirror opposites and symmetrical about a plane corresponding to double-headed arrow "S" in FIG. 4. Embodiments of wedge diffuser 16 are not so limited, however. For example, in further embodiments, $D_1$ and $D_2$ may vary with respect to each other or, perhaps, only one of pressure sidewall 70 and suction sidewall 72 may be imparted with a concave (or other non-linear) sidewall region. Still other variations in sidewall geometries are also possible without departing from the scope of the disclosure. For example, in alternative implementations, the upstream sidewall region of pressure sidewall 70 and/or suction sidewall 72 may be imparted with a slight concavity or another non-linear geometry, such as an undulating or chevron-shaped geometry. Further, in certain embodiments, pressure sidewall 70 and suction sidewall 72 may both have concave profiles at certain locations, but the concavity suction sidewall 72 may be shallower than that of pressure sidewall 70 (such that $D_1 < D_2$) to, for example, reduce flow separation within the diffuser flow channels. In embodiments, less concavity (depth 77), on suction sidewall 72 as compared to the concavity (depth 75) on the pressure sidewall 70, means less theta angle for example, at the midspan vs. the theta angle at the midspan for the pressure surface. The relationship $D_1 < D_2$ may be true at any given point along the vane 32 where there is a nonlinear sidewall geometry. In yet other embodiments, this relationship may be inverted such that $D_2 < D_1$; $D_1$ and $D_2$ may be equivalent; or one of sidewalls 70, 72 may be imparted with strictly a linear (straight line element) sidewall geometry, while the other of sidewalls 70, 72 is imparted with a concave sidewall geometry. As a still further possibility, pressure sidewall 70 and suction sidewall 72 may each transition from a linear sidewall geometry to a non-linear (e.g., concave) sidewall geometry when moving along the length of the vane; however, the particular locations at which sidewalls 70, 72 transition from linear to non-linear (e.g., concave) sidewall geometries may differ, as discussed more fully below in conjunction with FIG. 4.

Advancing next to FIG. 4, two adjacent diffuser vanes 32(a),(b) contained in wedge diffuser 16 are shown with endwalls 34, 36 hidden from view and viewed axially along an axis parallel to centerline 20. Diffuser vanes 32(a),(b) laterally bound or border a diffuser flow passage or channel 38(a), which extends between an inlet 40 and a corresponding outlet 42 of diffuser 16 in the previously-described manner. Diffuser flow channel 38(a) has a throat indicated generally at 73, with a width that is identified by double-headed arrow 82 in FIG. 4. The geometric throat width 82 is a dimension (i.e. minimum dimension between two adjacent diffuser vanes) that is tightly controlled during the manufacturing process of the diffuser flowbody 32, 34, 36. Variation in the width 82 changes throat area, flow capacity, and may undesirably adversely impact complex 3D flow diffusion process occurring upstream of throat 73, which may reduce diffuser stall margin at certain operating conditions.

The throat 73 of channel 38(a) is measured along the arc distance tangent to facing vane surfaces defining a particular diffuser flow channel; e.g., facing surfaces 70, 72 defining channel 38(a) in the illustrated example. The length 95 of the diffuser flow channel 38(a) is also indicated at L by the double headed arrow. As illustrated, the length 95 is indicated at the centerline 99 of the diffuser flow channel 38(a), where the centerline 99 is midway between adjacent diffuser vanes 32(a) and 32(b). The double-headed arrow 82 indicates the width 82 at the flow channel throat 73. The width 82 is indicated along a line 79, which is a reference line for purposes of description. The line 79 intersects, at point 85, the inboard tip of the diffuser vane 32(b) at its inboard vane end 60. The diffuser vane 32(b) delimits the pressure side of the diffuser flow channel 38(a) and the line 79 extends perpendicular to the flow channel centerline 99. The line 79 crosses the suction sidewall 72 of the diffuser vane 32(a) at a throat point 81 designated at the location of the throat. The reference line 79 extends through the diffuser vane 32(a) and crosses its pressure sidewall 70 at a pressure sidewall corresponding throat point 83. The throat point 81 and the corresponding throat point 83 define locations of the diffuser vane 32(a) where linear sidewall geometry may be preferred in certain embodiments to maintain a tightly controlled flow area as indicated above. The exit width of diffuser flow channel 38(a) is indicated by the line 97, which is also a reference line for purposes of description and is perpendicular to the flow channel centerline 99.

As illustrated in FIG. 4, dashed lines 84, 86 further denote the concavity of sidewalls 70, 72, respectively, as taken at the vane midspan of both diffuser vane 32(a) and diffuser vane 32(b). As indicated above, dashed lines 84, 86 represent the maximum concavity depth of sidewalls 70, 72 in the illustrated example; however, this need not be the case in other embodiments when, for example, the concave geometry (or other non-linear geometry) of the sidewall regions is asymmetrical at the midspan. The leading-edge passages of high performance wedge diffuser 16 may be shaped and dimensioned (e.g., imparted with a rectangular (2D-straight) or parallelogram (3D-lean) shape) to optimize spanwise incidence to incoming flow and thereby reduce any associated blockage and performance impact to diffuser 16, as shown.

As shown in the lower left corner of FIG. 4, arrow "n" represents the direction of rotation of impeller 18 (FIG. 1) and, therefore, the direction of the tangential component or swirl imparted to the airflow entering high performance wedge diffuser 16. Several dimensional parameters are also called-out in FIG. 4 and defined as follows:

2θ—the divergence angle of diffuser flow channel 38(a) taken in a plane orthogonal to centerline 20 and at the junctures of diffuser vanes 32 with either or both of endwalls 34, 36 (FIG. 1);

2θ'—the divergence angle of diffuser flow channel 38(a) taken along the diffuser midspan (a portion of which is identified by dashed line 80 in FIG. 3);

L—the length of diffuser flow channel 38(a) at the centerline 99 of the diffuser flow channel 38(a);

r2—the exit radius of impeller 18;

r4—the radius of the leading edge of diffuser 16;

r6—the trailing edge radius of diffuser 16;

h5—the width 82 of diffuser flow channel throat 73 which is defined as the minimum distance between two diffuser vanes; and h6—the exit width of diffuser flow channel 38(a).

The locations at which sidewalls 70, 72 of diffuser vane 32 transition from linear (straight line element) sidewall geometries to non-linear (e.g., concave) sidewall geometries can be more clearly seen in FIG. 4. Note, specifically, intersection points 87 between dashed lines 84 (representing the maximum depth of concavity for the non-linear sidewall regions of pressure sidewalls 70) and the outline of pressure sidewalls 70. Note also intersection point 89 between dashed lines 86 (representing the maximum depth of concavity for the non-linear sidewall region of suction sidewall 72) and the outline of suction sidewalls 72. Intersection points 87, 89 thus demarcate to the transition regions between the upstream sections of vane sidewalls 70, 72 having linear sidewall geometries and the downstream sections of vane sidewalls 70, 72 imparted with concave sidewall geometries.

The locations at which vane sidewalls 70, 72 transition from linear sidewall geometries to non-linear geometries will vary among embodiments. In many instances, at least one vane sidewalls 70, 72 transitions from a linear sidewall geometry to a non-linear (e.g., concave) sidewall geometry at location adjacent flow channel throat 73; the term "adjacent," as appearing in this context, defined as located no further from throat 73 than 35% of the sidewall length in either the upstream or downstream direction. Accordingly, pressure sidewall 70 is considered to transition from a linear sidewall geometry to a concave sidewall geometry at a location adjacent throat 73 when intersection point 87 is located no further than 35% of the length of pressure sidewall 70. Similarly, suction sidewall 72 is considered to transition from a linear sidewall geometry to a concave sidewall geometry at a location adjacent throat 73 when intersection point 89 is located no further than 35% of the length of suction sidewall 72. More generally, at least one of vane sidewalls 70, 72 will transition from a linear sidewall geometry to a non-linear sidewall geometry in a transition region or juncture, which is located closer to flow channel throat 73 than to either the inboard or outboard vane end.

As previously indicated, at least one vane sidewalls 70, 72 will typically transition from a linear sidewall geometry to a non-linear (e.g., concave) sidewall geometry in a region or location adjacent flow channel throat 73. The transition region can be located upstream of, located downstream of, or located substantially at flow channel throat 73. For example, as indicated in FIG. 4 by intersection point 89, suction sidewalls 72 may transition from a linear sidewall geometry to a concave sidewall geometry at a location slightly downstream of flow channel throat 73. Similarly, and as indicated in FIG. 4 by intersection point 87, pressure sidewalls 70 may transition from a linear sidewall geometry to a concave sidewall geometry at a location further downstream of flow channel throat 73, but still located closer to throat 73 than to outer vane ends 62. Such a design may help maximize available channel length for transitioning from the minimum concavity to a maximum concavity at outboard ends 62 of vanes 32, while further promoting airflow to enter diffuser inlets 40 in a relatively smooth, un-separated manner. As illustrated, the intersection point 87 marks the transition between upstream linear sidewall geometry and downstream concave sidewall geometry on the pressure side of diffuser vane 32(a). The intersection point 87 is located downstream from the corresponding throat point 83, in a direction toward the diffuser outlet 42 from the throat 73. The intersection point 89 marks the transition between upstream linear sidewall geometry and downstream concave sidewall geometry on the suction side of diffuser vane 32(a). The intersection point 89 is located downstream from the throat point 81, in a direction toward the diffuser outlet 42 from the throat 73. Locating the transitions as designated by the intersection points 87, 89 downstream of the throat 73, and specifically downstream from the throat point 81 and from the corresponding throat point 83, avoids undesirable variation in the width 82 that may create changes in throat area, changes in flow capacity, and may impact on the complex three dimensional flow diffusion process. Maintaining the transition(s) downstream of the flow channel throat 73 provides the benefit of providing independent control of diffusion levels upstream and downstream of the throat 73 during the design process in tailoring the diffuser flow channel 38(a) to its intended application. In addition, by locating the transition downstream of the flow channel throat 73, improved performance benefits are enabled where aerodynamic matching between the impeller 18 and the diffuser channels 38 is achievable in product development and manufacturing. It has been discovered that transitioning from linear sidewall geometries to concave sidewall geometries downstream from the throat 73 where Mach numbers are lower than upstream from the throat 73, avoids introducing losses due to cross-sectional changes which may introduce local secondary flows affecting aerodynamic performance. Locating the concave sidewall geometry (variable 2-theta) of the end walls only downstream of the throat 73 may provide additional manufacturing benefits in terms of ease in machining profile tolerances, reduced tool length and associated chattering, and ease of tool access when the machining operation is applied from the outboard vane end 62 of the diffuser vane 32(a). Improved aerodynamic performance is achieved by improving mixing and diffusion in the diffuser channels and reducing wake and blockage in the downstream deswirl section. To achieve desirable performance characteristics the transitions may be located upstream as far as possible without impacting the throat area during manufacturing (i.e. the concave sidewall geometry is limited to the part of the vane downstream from the line 79, while its length is maximized). Accordingly, locating the transitions adjacent to the flow channel throat 73 in this context means downstream from the throat 73, but as close to the throat 73 as is feasible given manufacturing constraints without impacting flow area at the throat.

The value of 2θ (the divergence angle of diffuser flow channel 38(*a*) at the junctures of vanes 32 with either of endwalls 34, 36) and the value of 2θ' (the divergence angle of diffuser flow channel 38(*a*) at the diffuser midspan) will vary among embodiments. As a point of emphasis, the respective values of 2θ and 2θ' may be tailored or adjusted by design to, for example, suit a particular application or usage. In embodiments, 2θ and 2θ' may be selected based upon the characteristics of impeller 18 or other components of the centrifugal compression system in which wedge diffuser 16 is utilized, such as compression system 12 shown in FIG. 1. This notwithstanding, certain fundamental relationships may pertain across embodiments of wedge diffuser 16. For example, it may generally be desirable to maximize the value of 2θ' to the extent practical, while preventing 2θ' from becoming overly large and promoting flow separation, turbulence, and other undesired effects within diffuser flow channels 38, particularly under overspeed conditions. To balance these competing concerns, 2θ' may range from about 5 degrees) (°) and about 14°; and, preferably, between about 7° and about 12° in embodiments. In other implementations, 2θ' may be greater than or less than the aforementioned ranges. Additionally or alternatively, 2θ' may be equal to or greater than 2θ plus about 4°, while 2θ' is equal to or less than 14° in at least some instances such that the following equation pertains: 2θ+4°≤2θ'≤14°. In still other implementations, and by way of non-limiting example, 2θ' may between 10% and 50% greater than 2θ and, more preferably, between 35% and 40% greater than 2θ. Finally, and briefly again to FIG. 3, the angular value of 2θ' may be selected based upon the depth of concavity at the outboard ends of vanes 32 such that, for example, $D_1$, $D_2$, or both range from about 5% to about 25% of $T_1$ or $T_2$ in embodiments. In still other embodiments, the values of $D_1$, $D_2$, 2θ, and 2θ' may be varied, as appropriate, to suit a particular application or usage of wedge diffuser 16.

As indicated above, the term "wedge diffuser" is defined as a diffuser containing a plurality of vanes having vane thicknesses at or adjacent the downstream (e.g., outboard) ends of the vanes exceeding, and generally tapering downward to, the vane thicknesses at or adjacent the upstream (e.g., inboard) ends of the vanes. The suction and pressure sides of a wedge diffuser may have a linear profile, a curved profile, a line-arc-line profile, or other profile, as seen looking along the centerline of wedge diffuser 16 in a fore-aft or aft-fore direction. For example, and as shown in FIG. 4, pressure sidewalls 70 and/or suction sidewalls 72 of diffuser vanes 32 may follow a line-arc-line profile, with a first line (linear profile section) occurring between inboard vane ends 60 leading toward the throat 73; a slight arc (curved profile section) along suction sidewalls 72 in throat 73 area; and a second linear (linear profile section) following throat 73 extending to outboard vane ends 62. Again, in further embodiments, suction sidewalls 72 and/or pressure sidewalls 70 may have more complex or less complex profiles; e.g., sidewalls 70, 72 may each have a linear or gently curved profile extending from inboard vane ends 60 to outboard vanes ends 62.

High performance wedge diffuser 16 has been shown to achieve superior aerodynamic performance levels relative to conventional wedge diffusers of comparable shape, dimensions, and construction, but lacking vanes having concave (or other non-linear) sidewall regions. Without being bound by theory, it is believed that improved mixing and diffusion can be achieved in diffuser flow channels 38 due, at least in part, to the variance in the 2θ and 2θ' parameters, as previously discussed. Concurrently, wake and flow blockage may be reduced downstream of wedge diffuser 16; e.g., as may help optimize performance of deswirl section 46 shown in FIG. 1. For at least these reasons, embodiments of wedge diffuser 16 are well-suited for usage in GTEs demanding higher pressure ratios (improved pressure recovery in the diffusion system), improved stage efficiency, and similar stability (surge margin) as compared to traditional wedge diffusers. Compression system performance improvements that may be achieved in embodiments of wedge diffuser 16, as will now be discussed in connection with FIGS. 5-8.

Performance Benefits of High Performance Wedge Diffuser

FIGS. 5-8 set-forth a number of graphs (graphs 88, 90, 92, 94), which set-forth performance improvements potentially achieved by embodiments of wedge diffuser 16 as compared to a conventional wedge diffuser containing vanes having strictly linear (straight line element) sidewall geometries. Addressing first graph 88 shown in FIG. 5, static pressure rise or recovery coefficient of the diffusers is plotted on the ordinate or vertical axis of graph 88, while corrected mass flow rate exiting the impeller (and thus entering the wedge diffuser) is plotted on the abscissa or horizontal axis of graph 88. As can be seen, high performance wedge diffuser 16 (trace 96) demonstrates superior recovery coefficient over the conventional wedge diffuser (trace 98), with static pressure recovery coefficient (Cp) is calculated as follows:

$$Cp = \frac{Ps_{exit} - Ps_{inlet}}{Po_{inlet} - Ps_{inlet}} \qquad \text{EQ. 1}$$

wherein "$Ps_{exit}$" is the static pressure at diffuser vane exit, "$Ps_{inlet}$" is the static pressure at the diffuser vane inlet, and "$Po_{inlet}$" is the total pressure at diffuser vane inlet.

Comparatively, graph 90 (FIG. 6) plots total pressure loss (vertical axis) of the diffusion system versus corrected mass flow rate at the impeller exit (horizontal axis). In this case, high performance wedge diffuser 16 (trace 96) provides a decreased diffusion system total pressure loss coefficient or omega (ω) bar relative to the conventional wedge diffuser (trace 98). Here, omega (ω) bar is defined by EQ. 2 below, with "$Psd_{deswirl\_exit}$" measured at the exit or outlet of deswirl section 46 (FIG. 1). Further, "$Ps_{impeller\_exit}$" and "$Po_{impeller\_exit}$" are measured at the exit of the impeller such as impeller 18:

$$\bar{\omega} = \frac{Po_{impeller\_exit} - Po_{deswirl\_exit}}{Po_{impeller\_exit} - Ps_{impeller\_exit}} \qquad \text{EQ. 2}$$

Figure 7:
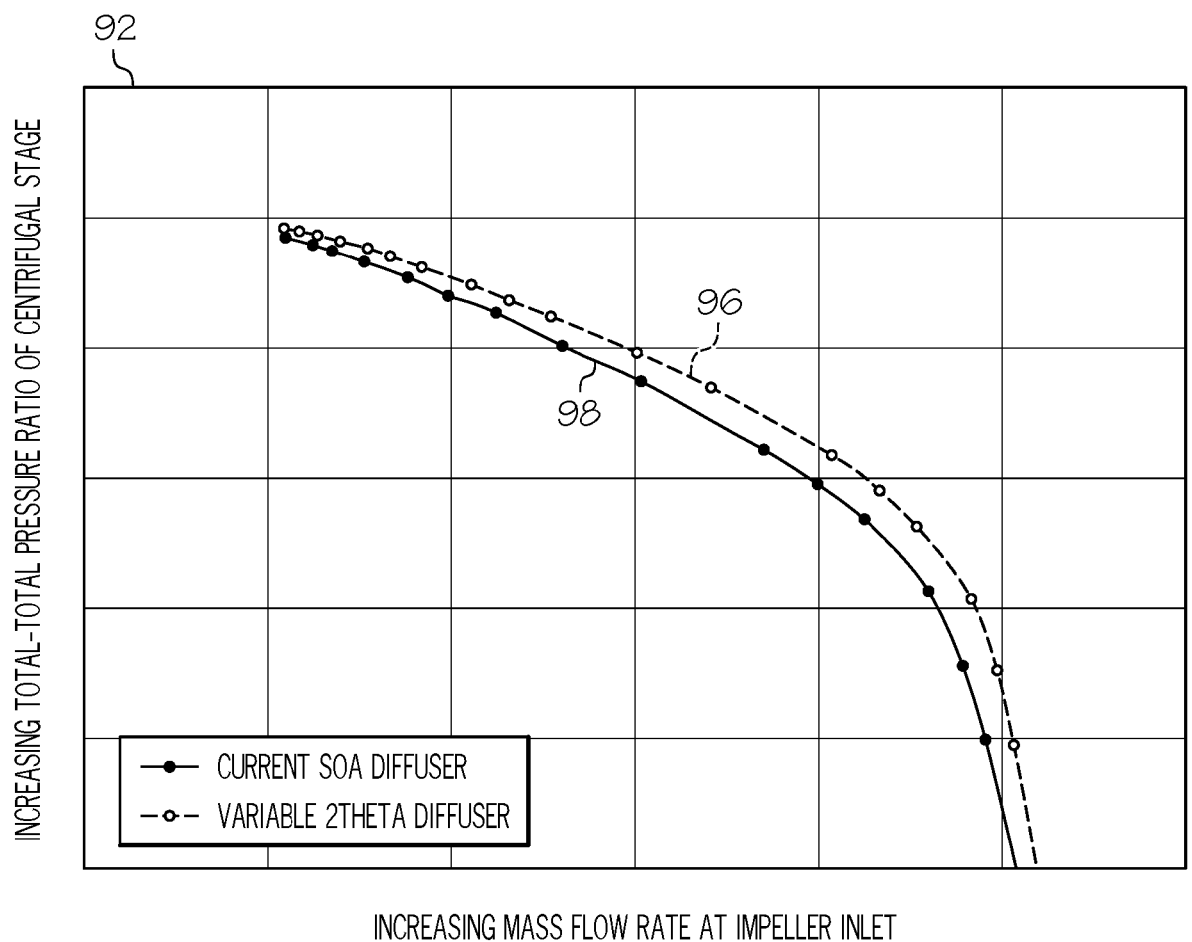
Figure 8:
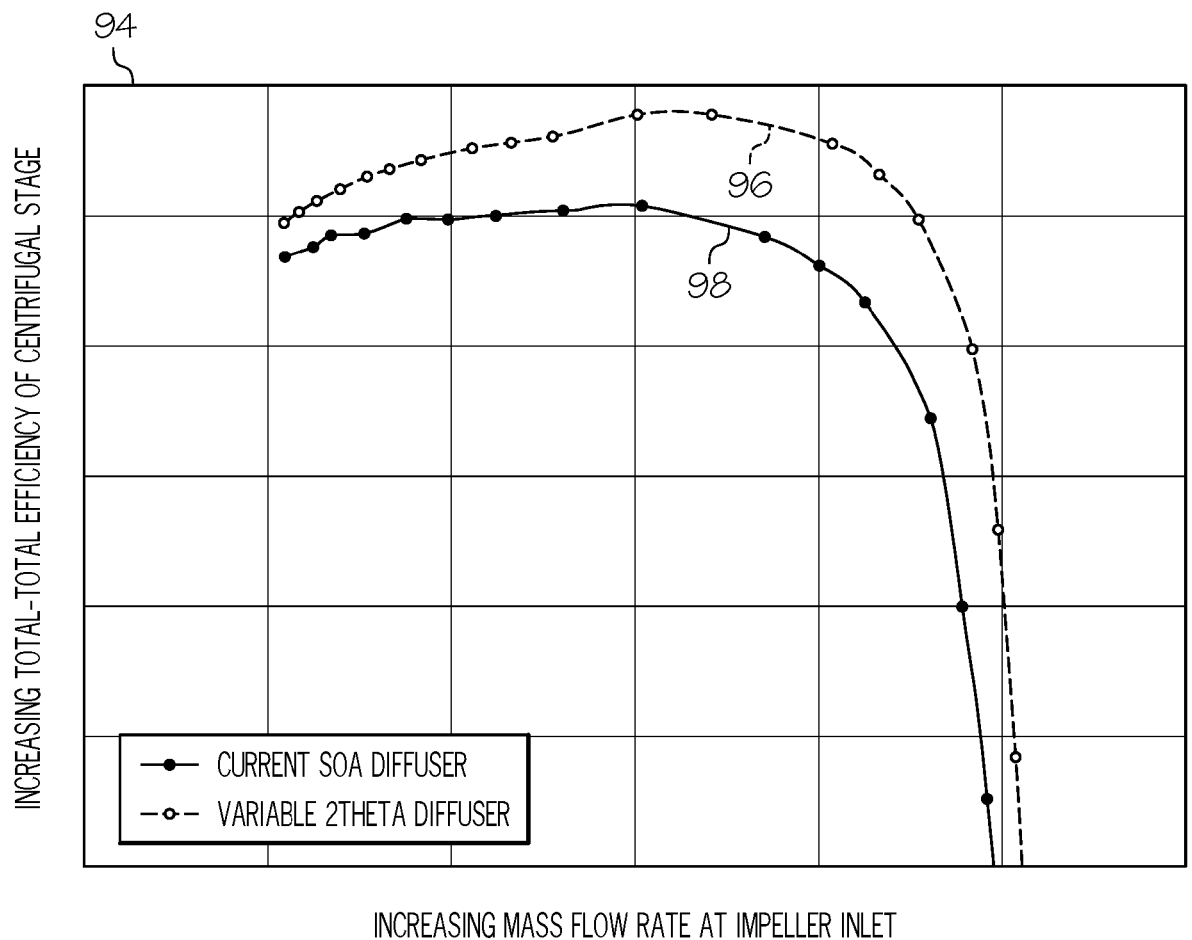

Turning next to graph 92 shown in FIG. 7, the total pressure ratio of the compression system including high performance wedge diffuser 16 (vertical axis) versus corrected mass flow rate at the impeller inlet (horizontal axis) is plotted. The simulation results show appreciably enhanced centrifugal stage total-total pressure ratio for wedge diffuser 16 (trace 96) as compared to the conventional wedge diffuser (trace 98). Here, compressor stage pressure ratio (PR) defined as:

$$PR = \frac{Po_{StageExit}}{Po_{StageInlet}} \qquad \text{EQ. 3}$$

wherein "$Po_{StageExit}$" is the total pressure at the inlet of the compressor stage, while "$Po_{StageInlet}$" is the total pressure at the outlet of the compressor stage.

Finally, graph 94 (FIG. 8) plots compression system total-total efficiency (vertical axis) versus corrected mass flow rate at the impeller inlet (horizontal axis). As can be seen, wedge diffuser 16 (trace 96) demonstrates improved stage total-total efficiency with an increased range over the conventional wedge diffuser (trace 98), as calculated utilizing EQ. 4 below.

$$IsentropicEfficiency = \qquad \text{EQ. 4}$$
$$\frac{IsentropicCompWork}{RealCompWork} = \frac{hs_{StageExit} - h_{StageInlet}}{hr_{StageExit} - h_{StageInlet}}$$

wherein "$_{StageInlet}$" is the specific enthalpy at the stage inlet, "$hs_{StageExit}$" is the specific enthalpy at the stage exit for the isentropic process, and "$hr_{StageExit}$" is the specific enthalpy at the stage exit for the real or actual process.

CONCLUSION

The foregoing has provided high performance wedge diffusers containing tapered vanes, which are imparted with unique sidewall geometries enhancing diffuser performance characteristics. Improved aerodynamic performance is achieved by improving mixing and diffusion in the diffuser channels and reducing wake and blockage in the downstream deswirl section. Embodiments of the high performance wedge diffuser may contain vanes having sidewalls, which transition from linear (straight line element) sidewall geometries to non-linear (e.g., concave) sidewall geometries at strategically located points; e.g., at points adjacent the channel throats. The suction sidewalls, the pressure sidewalls, or both may be imparted with such a concave or other non-linear geometry in embodiments. Diffuser shown to have superior aerodynamic performance by improving mixing and diffusion in diffuser passage and reducing wake and blockage in downstream deswirl section. Embodiments of the above-described high performance wedge diffusers can be fabricated at manufacturing costs and durations similar to conventional wedge diffusers. As a still further benefit, embodiments of the above-described high performance wedge diffuser may be substituted for conventional wedge diffusers in existing compression systems as component replacement requiring relatively little, if any additional modification to the system.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A wedge diffuser, comprising:
    a diffuser flowbody having an inner peripheral portion and an outer peripheral portion;
    diffuser flow channels extending through the diffuser flowbody, the diffuser flow channels comprising:
        flow channel inlets formed in the inner peripheral portion of the diffuser flowbody;
        flow channel outlets formed in the outer peripheral portion of the diffuser flowbody; and
        flow channel throats in the diffuser flow channels; and
    diffuser vanes contained in the diffuser flowbody and partitioning the diffuser flow channels, each of the flow channel throats disposed at a point of minimum distance between two immediately neighboring of the diffuser vanes, the diffuser vanes comprising a first plurality of vane sidewalls transitioning from linear sidewall geometries to non-linear sidewall geometries at transition locations disposed after the flow channel throats in a flow direction, the transition locations disposed immediately after the flow channel throats, wherein a portion of the diffuser vanes comprises the linear sidewall geometries from the flow channel inlets to the flow channel throats.

2. The wedge diffuser of claim 1 wherein the first plurality of vane sidewalls transitions from linear sidewall geometries to non-linear sidewall geometries at the flow channel throats.

3. The wedge diffuser of claim 1 wherein the diffuser vanes further comprise:
    pressure sidewalls partially bounding the diffuser flow channels, the pressure sidewalls each transitioning from the linear sidewall geometries to the non-linear sidewall geometries at a first location between the flow channel inlets and the flow channel outlets; and
    suction sidewalls further partially bounding the diffuser flow channels, the suction sidewall each transitioning from the linear sidewall geometries to the non-linear sidewall geometries at a second location between the flow channel inlets and the flow channel outlets;
    each respective pressure sidewall and suction sidewall defining a diffuser flow channel with a flow channel centerline, wherein a line extending from an inlet end of a first vane of the diffuser vanes with the pressure sidewall and perpendicular to the flow channel centerline passes through and defines a throat point and a corresponding throat point on a second vane of the diffuser vanes with the suction sidewall,
    wherein the throat point and the corresponding throat point define a respective throat of the flow channel throats.

4. The wedge diffuser of claim 1 wherein the non-linear sidewall geometries comprise concave sidewall geometries.

5. The wedge diffuser of claim 4 wherein the concave sidewall geometries comprise a first depth on suction sides of the diffuser vanes and a second depth on pressure side of the diffuser vanes, where the second depth is greater than the first depth at a common point along a length of the diffuser vanes.

6. The wedge diffuser of claim 4 wherein the concave sidewall geometries increase in concavity depth with increasing proximity to the flow channel outlets.

7. The wedge diffuser of claim 4 wherein the diffuser vanes comprise outboard ends to which the concave sidewall geometries extend.

8. The wedge diffuser of claim 7 wherein the diffuser vanes comprise a maximum thickness ($T_1$) at the outboard ends; and
wherein the concave sidewall geometries have a maximum concavity depth ($D_1$) at the outboard ends, the maximum concavity depth ($D_1$) between 5% and 25% of the maximum thickness ($T_1$).

9. The wedge diffuser of claim 1 wherein the diffuser flowbody comprises an endwall further bounding the diffuser flow channels; and
wherein the diffuser flow channels further comprise:
a first angle of divergence ($2\theta$') measured at a juncture between the endwall and the diffuser vanes; and
a second angle of divergence ($2\theta$') measured at a midspan of the diffuser vanes, the second angle of divergence ($2\theta$) exceeding the first angle of divergence ($2\theta$).

10. The wedge diffuser of claim 9 wherein the second angle of divergence ($2\theta$') is between 10% and 50% greater than the first angle of divergence ($2\theta$') and wherein $$2\theta + 4° \leq 2\theta' \leq 14°.$$

11. The wedge diffuser of claim 1 wherein the diffuser vanes comprise a first diffuser vane and a second diffuser vane adjacent the first diffuser vane, wherein a pressure side of the first diffuser vane faces a suction side of the second diffuser vane, wherein respective diffuser flow channel between the first and second diffuser vanes defines a flow channel centerline, wherein a line passing through an inlet end of the first diffuser vane that is perpendicular to the flow passage centerline passes through and defines a throat point on the suction side of the second diffuser vane, wherein the line passes through and defines a corresponding throat point on a pressure side of the second diffuser vane, wherein the transition location of the second diffuser vane is downstream, meaning after in the flow direction, of the throat point and the corresponding throat point.

12. The wedge diffuser of claim 1 wherein the first plurality of vane sidewalls comprises pressure sidewalls of the diffuser vanes.

13. The wedge diffuser of claim 1 wherein the first plurality of vane sidewalls comprises suction sidewalls of the diffuser vanes.

14. A wedge diffuser, comprising:
a diffuser flowbody, comprising:
a first endwall;
a second endwall; and
diffuser vanes positioned in an annular array between the first endwall and the second endwall; and
diffuser flow channels extending through the diffuser flowbody, the diffuser flow channels bound by the first endwall, the second endwall, and the diffuser vanes, each of the diffuser flow channels defining a flow channel throat that lies along a line extending from an inboard end of one of the diffuser vanes, each of the flow channel throats disposed at a point of minimum distance between two immediately neighboring of the diffuser vanes;
wherein the diffuser vanes comprise:
upstream sidewall regions having a first sidewall geometry in a spanwise direction;
downstream sidewall regions having a second sidewall geometry in the spanwise direction, the second sidewall geometry different than the first sidewall geometry; and
a transition from the first sidewall geometry to the second sidewall geometry,
wherein the transition of each of the diffuser vanes is disposed downstream from, and approximately at, the flow channel throat of the respective diffuser vane where upstream means before and downstream from means after in the diffuser flow channels in a flow direction, wherein a portion of the diffuser vanes comprises the first sidewall geometry from the flow channel inlets to the flow channel throats.

15. The wedge diffuser of claim 14 wherein the first and second sidewall geometries comprises linear and concave sidewall geometries, respectively.

16. The wedge diffuser of claim 14 wherein the diffuser flow channels comprise:
flow channel inlets formed in an inner peripheral portion of the diffuser flowbody; and
flow channel outlets formed in an outer peripheral portion of the diffuser flowbody; and
wherein the second sidewall geometry comprises a concave sidewall geometry, which increases in concavity depth with increasing proximity to the flow channel outlets, wherein the concave sidewall geometry comprise a first depth on suction sides of the diffuser vanes and a second depth on pressure side of the diffuser vanes, where the second depth is greater than the first depth at a common point along a length of the diffuser vanes.

17. The wedge diffuser of claim 16 wherein the upstream sidewall regions are located upstream of, and at, the flow channel throats, while the downstream sidewall regions are located downstream of the flow channel throats.

18. The wedge diffuser of claim 14 wherein the diffuser flow channels comprise:
a first angle of divergence ($2\theta$) taken at a juncture between the first endwall and the diffuser vanes; and
a second angle of divergence ($2\theta$') taken at a midspan of the diffuser vanes, the second angle of divergence ($2\theta$') exceeding the first angle of divergence ($2\theta$).

19. The wedge diffuser of claim 18 wherein the second angle of divergence ($2\theta$') is between about 5 degrees and about 14 degrees.

20. A wedge diffuser comprising:
a diffuser flowbody having an inner peripheral portion and an outer peripheral portion;
diffuser flow channels extending through the diffuser flowbody, the diffuser flow channels comprising:
flow channel inlets formed in the inner peripheral portion of the diffuser flowbody;
flow channel outlets formed in the outer peripheral portion of the diffuser flowbody; and
flow channel throats fluidly coupled between the flow channel inlets and the flow channel outlets; and
diffuser vanes contained in the diffuser flowbody and partitioning the diffuser flow channels, the diffuser vanes comprising a first plurality of vane sidewalls transitioning from linear sidewall geometries to nonlinear sidewall geometries at transition locations disposed downstream from the flow channel throats where downstream means after in a flow direction,
wherein each of the flow channel throats is defined at a point of minimum distance between adjacent of the diffuser vanes along the diffuser flow channels, wherein the non-linear sidewall geometries comprise concave sidewall geometries,
wherein the concave sidewall geometries comprise a first depth on suction sides of the diffuser vanes and a second depth on pressure side of the diffuser vanes, where the second depth is greater than the first depth at a common point along a length of the diffuser vanes.

\* \* \* \* \*